United States Patent [19]

Crouse et al.

[11] Patent Number: 5,317,565
[45] Date of Patent: May 31, 1994

[54] METHOD OF SEQUENCING BUS OPERATIONS IN A SIMPLEX SWITCH

[75] Inventors: Richard S. Crouse, Boca Raton, Fla.; John J. Cazzolla, Cary, N.C.; Luke L. Chang, Boca Raton, Fla.; Marco M. Hurtado, Boca Raton, Fla.; Kha D. Nguyen, Boca Raton, Fla.; Jose L. Rivero, Boca Raton, Fla.; Jose J. Ruiz, Boca Raton, Fla.; Louis Salcedo, Delray Beach, Fla.

[73] Assignee: International Business Machines Corporation, Armonk, N.Y.

[21] Appl. No.: 9,602

[22] Filed: Jan. 26, 1993

[51] Int. Cl.$^5$ ............................................. H04Q 11/04
[52] U.S. Cl. .................................... 370/58.2; 370/58.3; 370/61; 370/85.6; 370/110.1; 340/826
[58] Field of Search ................... 370/58.2, 58.3, 61, 370/85.6, 85.11, 110.1, 60.1; 379/229, 230; 340/826

[56] References Cited

U.S. PATENT DOCUMENTS

| | | | |
|---|---|---|---|
| 4,009,344 | 2/1977 | Flemming | 179/15 BS |
| 4,307,461 | 12/1981 | Brickman et al. | 370/58 |
| 4,328,543 | 5/1982 | Brickman et al. | 364/200 |
| 4,654,845 | 3/1987 | Mukerji | 370/85.6 X |
| 4,706,081 | 11/1987 | Hart et al. | 340/825.03 |
| 4,713,806 | 12/1987 | Oberlander et al. | 370/58.2 |
| 4,748,658 | 5/1988 | Gopal et al. | 379/229 X |
| 4,817,082 | 3/1989 | Orsic | 370/58 |
| 4,943,959 | 7/1990 | Arnold | 370/85.5 |
| 4,972,368 | 11/1990 | O'Brien et al. | 364/900 |
| 5,042,031 | 8/1991 | Yokoyama et al. | 370/85.5 |
| 5,051,985 | 9/1991 | Cidon et al. | 370/85.005 |
| 5,070,501 | 12/1991 | Shimizu | 370/85.4 |
| 5,119,366 | 6/1992 | Ardon et al. | 370/58.3 X |
| 5,144,293 | 9/1992 | Rouse | 370/60 X |

Primary Examiner—Douglas W. Olms
Assistant Examiner—Russell W. Blum
Attorney, Agent, or Firm—Calfee Halter & Griswold

[57] ABSTRACT

A sequencing scheme is provided for prioritizing bus operations occurring in simplex switches which interconnect subsystems in a data communications system, thereby yielding improved aggregate system data throughput. The sequencing scheme provides procedures which simultaneously accommodate (i) concurrently pending requests to a first control bus which processes only circuit switched operations and (ii) concurrently pending requests to a second control bus which processes only packet switched operations, in an order which optimizes link level control message throughput of the simplex switch. The control messages which are coordinated by the sequencing scheme include connect and disconnect requests, connect and disconnect request acknowledgments, and data acknowledgments. All connect request and disconnect requests are managed by a connection processing (CP) bus, which operates as a circuit switching bus, and all data acknowledgments and connect request acknowledgments from subsystems attached to a cascaded switch are made over an out-of-band (OB) bus, which operates as a packet switching bus. Because connect and disconnect operations over the CP bus can proceed independently of acknowledgment operations over the OB bus, the sequencing procedures for each of the control buses are permitted to operate independently and simultaneously.

13 Claims, 2 Drawing Sheets

METHOD OF SEQUENCING BUS OPERATIONS IN A SIMPLEX SWITCH

FIELD OF THE INVENTION

The present invention relates generally to simplex switches for interconnecting subsystems in data communications systems and more particularly to a method of prioritizing bus operations occurring in such switches.

BACKGROUND OF THE INVENTION

Data communications systems which include more than one communications subsystem typically utilize a serial crossbar switch to functionally interconnect the subsystems. A serial crossbar switch is a hardware device which permits high-speed serialized data communication between attached subsystems. The switch physically attaches to each subsystem by means of an input-/output (I/O) port comprising an individual pair of optical fibers or wires. One of the pair of fibers or wires for each subsystem is used for transmitting information to other systems through the switch, and the other is used for receiving information from other systems via the switch.

The internal switching fabric of the serial crossbar switch provides for connections between any two connected subsystems. The subsystems communicate with each other over these connections, which logically establish communications paths between the transmit wire of a source (or calling) subsystem with a receive wire of a destination (or called) subsystem. In this manner, the switching fabric of the serial crossbar switch provides internal connection crosspoints which eliminate connection blocking. Connections between more than one pair of subsystems may exist concurrently. This concurrency gives the serial crossbar switch a significant performance advantage over single threaded interconnects such as serial ring networks, wherein only one connection between subsystems is permitted at a time.

Conventional serial crossbar switch designs operate on the basis of full duplex connectivity. In a full duplex connection, the switch logically connects the transmit wire of the calling subsystem to the receive wire of the called subsystem, while simultaneously logically connecting the transmit wire of the called subsystem to the receive wire of the calling subsystem. In this manner, each subsystem has a simultaneous communication path to and from the other connected subsystem in which to transfer information. One disadvantage of full duplex connectivity, however, is that communications between the subsystems is unidirectional along the separate transmit and receive paths. Data is transmitted along the transmit wire of the calling subsystem to the receive wire of the called subsystem, with only an occasional link-level data acknowledgment message sent in return along the transmit wire of the called subsystem to the receive wire of the calling subsystem. This underutilization of the reverse data path in a full duplex connection results in wasting nearly half of the potential throughput capacity of a serial crossbar switch. The wasted throughput capacity of a full duplex switch design may be recovered if a switch is instead designed to operate on the basis of simplex connectivity. In a simplex connection, a switch logically connects the transmit wire of the calling subsystem to the receive wire of the called subsystem. However, unlike the full duplex connection, a simplex connection does not provide a separate reverse path for returning messages. Messages addressed to the called subsystem may be received by the called subsystem from other subsystems on its receive link, and messages sent by the calling subsystem may be sent to other subsystems on its transmit link. The transmit link of the called subsystem is available to allow the called subsystem to establish connections with other subsystems, while at the same time, the receive link of the calling subsystem is available to allow connections to the calling subsystem from other subsystems.

The information carried by the transmit and receive links of the subsystems attached to the simplex switch includes data and control messages, which include connect and disconnect requests, connect and disconnect request acknowledgments, and data acknowledgments. For example, prior to sending data, calling subsystems request connections to (and subsequent disconnections from) other called subsystems via the switch by sending serially encoded connect request and disconnect request link-level control messages to the called subsystems. The called subsystem responds to the calling subsystem request by either acknowledging or not acknowledging the request. In addition, data acknowledgment messages (or error messages) are sent by a called subsystem to a calling subsystem after a data transfer sequence has been completed. Because a data acknowledgment message from the called subsystem indicates to the calling subsystem whether or not data has been lost during transmission, a data sequence transmission cannot be considered to have been successfully completed until the calling subsystem receives positive acknowledgment messages for each transmitted data sequence.

Because a simplex switch does not allocate independent reverse connection paths, a different technique must be provided to route the required connect and disconnect request acknowledgments and the data acknowledgments from a called subsystem to a calling subsystem. One preferred approach is to provide a packet switched network to route connect and disconnect request acknowledgments and the data acknowledgments to the appropriate subsystems without establishing connections between the subsystems, and a separate circuit switched network for connect and disconnect processing. The packet switched network routes control messages without establishing connections between the subsystems by a store-and forward technique wherein connect and disconnect request acknowledgments and data acknowledgments are temporarily stored in buffers in the switch prior to delivery to the appropriate subsystem. This store-and-forward packet switching method is advantageous because of the speed advantage achieved by eliminating the switching time delays associated with establishing switch connections.

In the typical hardware design of a simplex switch provided with circuit switched connect and disconnect requests, switch I/O ports respond to attached subsystem requests for connections and disconnections to other subsystems by generating operation requests to a common control bus within the switch which only processes circuit switched operations. However, because the I/O ports on the switch operate concurrently with each other, multiple I/O ports may simultaneously have request operations pending over the common circuit switching control bus, thereby creating servicing conflicts which the control bus must resolve.

In the typical hardware design of a simplex switch provided with packet switching of connect and disconnect request acknowledgments and data acknowledgments, switch I/O ports initiate subsystem-to-subsystem message routing by generating requests to access a common control bus which is provided for routing only packet switched messages. As with connection processing, it is possible for multiple ports to have simultaneously pending requests for access to the packet switching control bus and create conflicts which this control bus must resolve. Typically, as is the case with the circuit switching control bus, the requests are processed either in the order in which received or in round robin fashion.

Switching performance deteriorates, however, if no ordered sequencing scheme is provided for processing control bus access requests in a simplex switch, because an arbitrary sequencing scheme ignores more efficient manners in which to coordinate the granting of competing requests. It is an object of the present invention, then, to provide a priority scheme for sequencing bus operations in a simplex switch having separate packet switching and circuit switching control buses to maximize switch throughput performance.

SUMMARY OF THE INVENTION

The present invention provides a sequencing scheme for prioritizing bus operations occurring in simplex switches for interconnecting subsystems in data communications systems. The sequencing scheme provides procedures which accommodate simultaneously pending requests to a first control bus which processes only circuit switched operations and simultaneously pending requests to a second control bus which processes only packet switched operations, in an order which optimizes control message throughput of the simplex switch.

The sequencing scheme is implemented in a data communications system which comprises a plurality of data communications subsystems interconnected by one or more simplex switches which may be cascaded together. Each of the simplex switches is provided with sixteen external input/output (I/O) ports to which a subsystem may be attached. Because data and control message flow at the interface between the two cascaded switches exceeds that at a subsystem-I/O port interface, the switch to switch interface requires a pair of I/O ports.

The cascaded switches operate in a simplex mode of operation to route data and control messages between interconnected subsystems. The control messages sent between subsystems are link-level control messages and include connect and disconnect requests, connect and disconnect request acknowledgments, and data acknowledgments. All connect request and disconnect requests are made by a particular subsystem to a connection processing (CP) bus, which operates as a circuit switching bus. The I/O port to which the requesting subsystem is attached will respond to the connect or disconnect request by generating an operational command cycle to the CP bus. The switch responds to the CP command cycle by establishing the requested connections or disconnections. Each of the I/O ports in the switches is provided with buffering capability to optionally queue subsystem-to-subsystem connect request messages prior to their processing over the CP bus.

All data acknowledgments and connect request acknowledgments from subsystems attached to a cascaded switch are made over an out-of-band (OB) bus, which operates as a packet switching bus. The I/O port to which the called subsystem is attached responds by initiating an operational command cycle to the OB bus. The switch responds to the OB command cycle by transferring the acknowledgment control message to over the OB bus to the appropriate destination I/O port.

The I/O ports on the switch operate simultaneously, and thus it is possible for more than one subsystem to simultaneously send a connect or disconnect request message to its respective I/O port, resulting in more than one operational command cycle pending on the CP bus. It is also possible for more than one subsystem to simultaneously send a data acknowledgment or a connect request acknowledgment message to its respective I/O port, thereby causing more than one operational command cycle to be pending on the OB bus.

The determination of the sequence in which simultaneously pending requests to the CP bus are prioritized and subsequently processed is based on the following three principles. First, disconnect operations should be performed ahead of connect operations to optimize the availability of called subsystems, which have just completed the data transfer sequence for a previous connection, for subsequent connect requests. Second, if a connect request is pending against a called subsystem that is known to be unconnected at the time of the request, this connection should be established as soon as possible. Third, because connection processing latency through a switch to switch interface at a cascade port is typically longer than that of connection processing at a subsystem attached I/O port, pending operations over the CP bus involving the cascade port should be given priority over similar operations which do not need to pass through the cascade port.

With respect to packet switched operations occurring over the OB bus 32, the determination of the sequence in which simultaneously pending acknowledgments to the OB bus are prioritized and subsequently processed is also based on three principles. First, connect request acknowledgment messages, when routed to a calling subsystem, guarantee productive switch utilization since the calling subsystem immediately begins data transmission upon receipt of the acknowledgment message. Second, data acknowledgment messages, when routed to a calling subsystem, will only lead to improved switch utilization if the receipt of the acknowledgment message by the calling subsystem is in the critical path to continuing further data transfer operations. Third, as in the circuit switched analysis, operations involving the cascade port should be given higher priority.

Applying the above principles, a sequencing scheme may be developed for simultaneously managing (i) concurrently pending acknowledgments made to the OB bus and (ii) concurrently pending connect and disconnect requests made to the CP bus, in a manner which optimizes control message throughput of the switch, thereby yielding improved aggregate system data throughput. Because connect and disconnect operations over the CP bus can proceed independently of acknowledgment operations over the OB bus, sequencing procedures for each of the control buses are permitted to operate independently as well as simultaneously.

DETAILED DESCRIPTION OF THE PREFERRED EMBODIMENT

Figure 1:
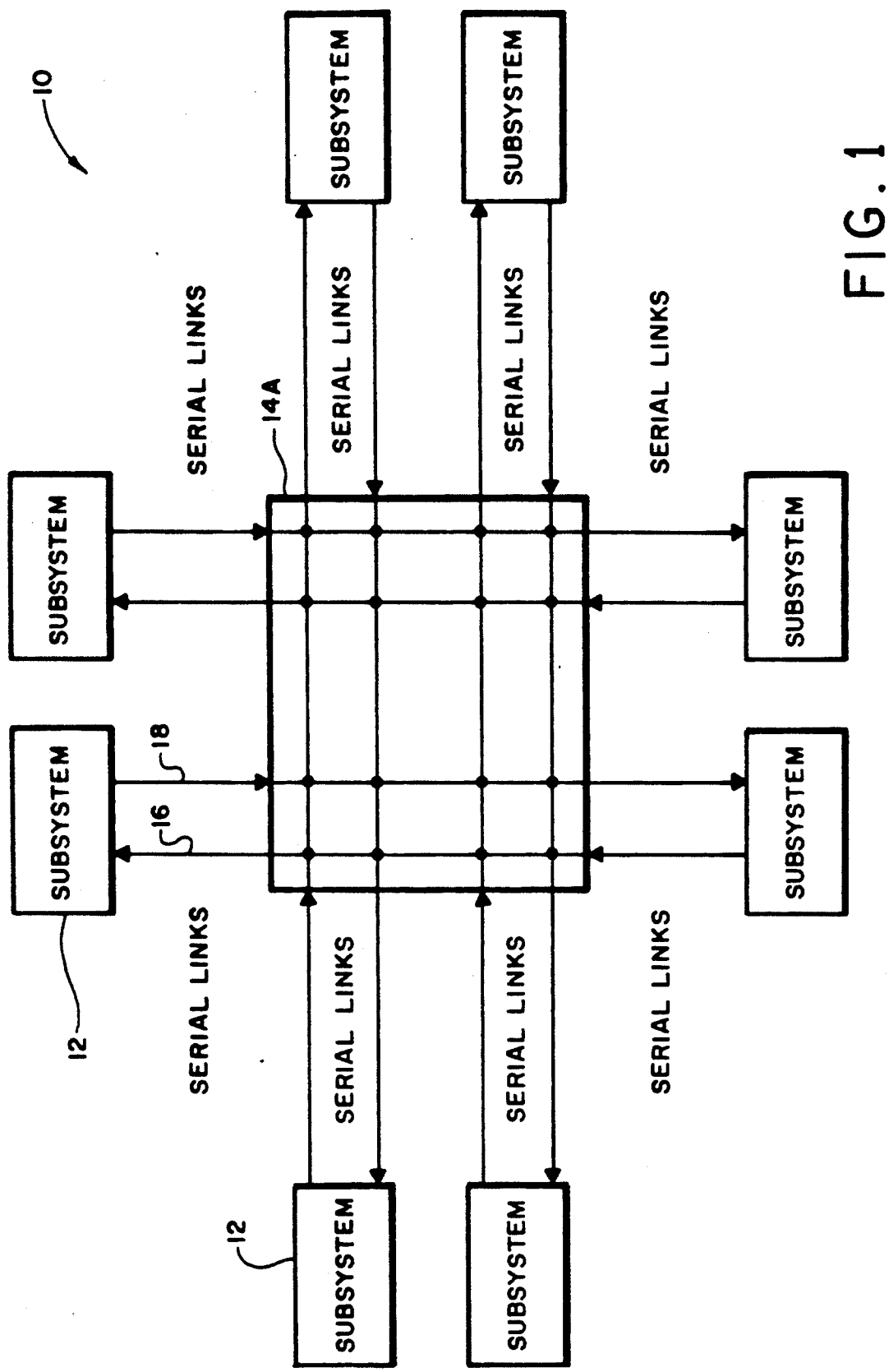
FIG. 1 is a block diagram of a communications system which includes a simplex switch constructed according to the principles of the present invention.

A data communications system 10 constructed according to the principles of the present invention is shown in FIG. 1. The system 10 comprises a plurality of data communications subsystems 12 interconnected by a simplex switch 14A. The switch 14A is provided with an internal crosspoint switching fabric, which provides internal connection crosspoints to eliminate connection blocking, and which permits connections between more than one pair of subsystems 12 concurrently.

The switch 14A is connected to the subsystems 12 by means of serial links, which may take the form of optical fibers or pairs of wires. One of the wires or cables is used as an incoming path 16 for reception of frames, which are units of control information and data transmission, from a calling subsystem, and the other is used as an outgoing path 18 for transmission of frames to a called subsystem. Although only eight subsystems are shown, up to sixteen subsystems may be interconnected by a single switch 14A. Expansion to greater than sixteen interconnected subsystems is accomplished by adding a second switch in a cascaded configuration.

Figure 2:
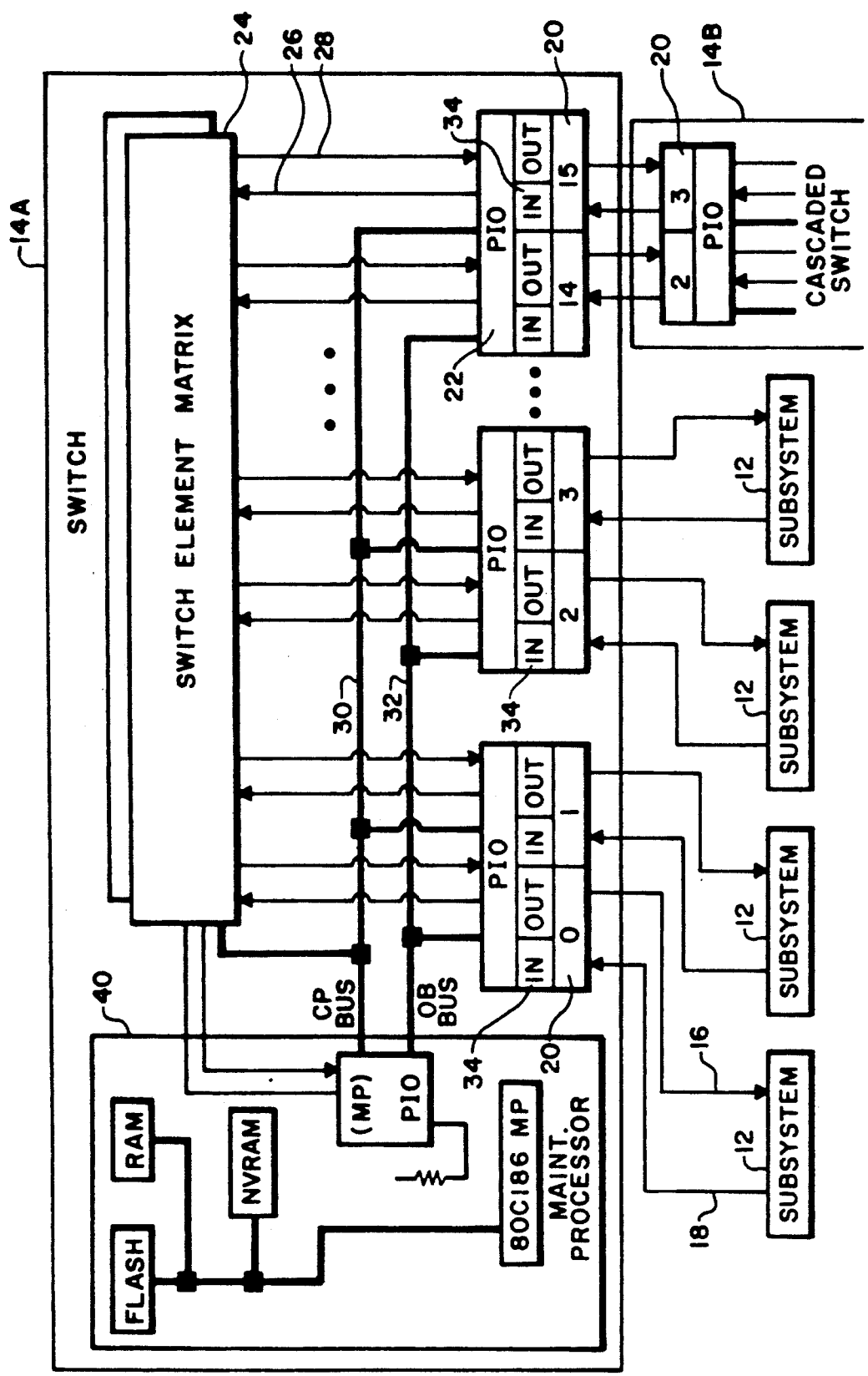
FIG. 2 illustrates in greater detail the internal construction of the simplex switch of FIG. 1.

A system having the capability for managing more than sixteen interconnected subsystems, by providing a second simplex switch 14B in cascaded configuration, is shown in FIG. 2. Each of the simplex switches 14A and 14B is provided with sixteen external input/output (I/O) ports 20, indicated as I/O ports 0–15 in switch 14A. The sixteen I/O ports 20 on each of the switches are provided by eight port input/output (PIO) modules 22, each of which modules provides a pair of I/O ports. The control logic for managing data and control message flow at the I/O ports 20 resides within the PIO modules 22.

Subsystems 12 within the system shown in FIG. 2 are attached to either switch 14A or 14B at one of the external I/O ports 20. Because data and control message flow at the interface between the two cascaded switches exceeds that at a subsystem-I/O port interface, the switch to switch interface requires a pair of I/O ports 20 (these corresponding pairs of I/O ports are shown as ports 14 and 15 on switch 14A and I/O ports 2 and 3 on switch 14B). Data and control message flow is greater at this switch to switch interface because the pair of cascade I/O ports defining the interface must route frames of data and control messages between every subsystem attached to switch 14A and every subsystem attached to switch 14B, whereas a subsystem-attached I/O port need only carry data and control message flow which is addressed either to or from its directly attached subsystem.

Each of the simplex switches 14A and 14B has a switch element matrix (SEM) matrix 24. The SEM matrix 24 provides the necessary crosspoint switch fabric logic for the switch 14A. When a subsystem attached to the switch requests a connect or a disconnect to another subsystem in the system, the switch responds by establishing or discontinuing the appropriate connective path through the SEM matrix 24.

The switches 14A and 14B operate in a simplex mode of operation to route data and control messages between interconnected subsystems 12. In this simplex mode of operation, both incoming path 16 and outgoing path 18 (FIG. 1) for a particular subsystem carry both data and control messages. Data is sent from a subsystem along outgoing path 18 to the PIO module 22 and on to the SEM matrix 24 over dedicated SEM data input bus 26. The switched data is then transferred from the SEM matrix to dedicated SEM data output bus 28 and the appropriate PIO module for subsequent transmission to an appropriate subsystem 12 via an incoming path 16.

The control messages sent along these connective paths 16, 18 are link-level control messages and include connect and disconnect requests, connect and disconnect request acknowledgments, and data acknowledgments. All connect request and disconnect requests are made by a particular subsystem over outgoing path 18 via a PIO module 22 to a connection processing (CP) bus 30, which connects each of the PIO modules 22 on a switch with each other and with the SEM matrix 24. The CP bus 30 operates as a circuit switching bus. Circuit switching is a process of connecting two or more subsystems that allows the exclusive use of a connective path circuit between the subsystems until the connection is released.

Typically, a calling subsystem 12 will request a connection to or disconnection from a called subsystem or subsystems by sending serially encoded connect request and disconnect request link-level control messages over outgoing path 18 via the switch to the called subsystems over incoming path 16. The I/O port 20 to which the requesting subsystem is attached will respond to the connect or disconnect request by generating an operational command cycle to the CP bus 30. The switch responds to the CP command cycle by establishing the requested connections or disconnections through the SEM matrix 24.

All data acknowledgments and connect request acknowledgments from subsystems attached to a cascaded switch are made over an out-of-band (OB) bus 32, which connects each of the PIO modules 22 on a switch with each other. The called subsystem acknowledges a connect or disconnect request and a data transfer via the same incoming path 16 (in reverse direction) which carried the connect request and the subsequent data to the called subsystem, through its attached port, and back to the calling subsystem through its outgoing path 18 (which is the same path that carried the connect request and the data out of the calling subsystem).

Because connect request acknowledgment messages are generated and transmitted directly by the I/O port attached to the called subsystem, connect request acknowledgments originating from and destined for subsystems attached to the same switch need not be routed through the OB bus. However, connect request acknowledgement messages originating from and destined for subsystems attached to different (cascaded) switches must be routed through the OB bus 32. The OB bus operates as a packet switching bus. Packet switching is process of routing and transferring these link-level control messages by means of addressed packets so that a connective path is occupied only during transmission of a packet. On completion of the transmission, the path is again made available for transfer of other packets.

The packet routing function of the serial simplex switch of the present invention is implemented by defining a fixed amount of serial transmission bandwidth within the total switch transmission bandwidth as reserved for routing data and connect request acknowledgment control messages, or out-of-band (OB) message frames. The remaining bandwidth of the total switch transmission bandwidth is used to transfer data, or in-band (IB) frames. Accordingly, data frames that are transferred within connections established by the switch are referred to as inband (IB) data traffic, and link level acknowledgment control message frames that are transferred via the packet router function are referred to as out of band (OB) message traffic.

Typically, a called subsystem 12 will acknowledge a data transmission or a connection or disconnection request made by a calling subsystem by indicating the acknowledgment to the I/O port 20 to which it is attached by means of a link-level acknowledgment control message. The I/O port 20 to which the called subsystem is attached responds by initiating an operational command cycle to the OB bus 32. The switch responds to the OB command cycle by transferring the acknowledgment control message to over the OB bus to the appropriate destination I/O port.

The I/O ports 20 on switches 14A and 14B operate simultaneously, and thus it is possible for more than one subsystem to simultaneously send a connect or disconnect request message to its respective I/O port, resulting in more than one operational command cycle pending on the CP bus 26. It is also possible for more than one subsystem to simultaneously send a data acknowledgment or a connect request acknowledgment message to its respective I/O port, thereby causing more than one operational command cycle to be pending on the OB bus 32. The present invention provides a sequencing scheme which accommodates simultaneously pending requests to both the CP bus and the OB bus and which prioritizes the requests so that they may be processed in an order which optimizes control message throughput of the simplex switch.

Each of the I/O ports 20 in the switches 14A and 14B is provided with an input buffer 34, which is used to store OB message frames prior to their processing over the OB bus 32, and subsystem-to-subsystem connect request messages prior to their processing over the CP bus 30. Control logic within the FIFO buffer 34 operates so as to queue the potentially multiple OB frames within the FIFO buffer for sequential processing over the OB bus, independently and concurrently with storing a single connect or disconnect message frame for processing over the CP bus 30. For example, a connect request made by a calling subsystem may be queued in FIFO buffer 34 in the I/O port attached to the calling subsystem until the called subsystem completes any previously queued connect requests and becomes available for a subsequent connection.

Eight different types of connect and disconnect request operations may simultaneously request processing over the CP bus. They are:

(i) a connection request by a calling subsystem, to a called subsystem connected to the same switch, which has been queued;

(ii) a connection request by a calling subsystem, to a called subsystem connected to the same switch, which has not been queued;

(iii) a disconnect request by a calling subsystem to disconnect from a called subsystem which is connected to the same switch and which is the destination of a pending queued connection request;

(iv) a disconnect request by a calling subsystem to disconnect from a called subsystem which is connected to the same switch and which is not the destination of any pending queued connection requests;

(v) a connection request by a calling subsystem, to a called subsystem connected to a cascaded switch, which has been queued;

(vi) a connection request by a calling subsystem, to a called subsystem connected to a cascaded switch, which has not been queued;

(vii) a disconnect request by a calling subsystem to disconnect from a called subsystem which is connected to a cascaded switch and which is the destination of a pending queued connection request; and (viii) a disconnect request by a calling subsystem to disconnect from a called subsystem which connected to a cascaded switch and which is not the destination of any pending queued connection requests.

The determination of the sequence in which simultaneously pending requests to the CP bus are prioritized and subsequently processed is based on the following three principles. First, disconnect operations should be performed ahead of connect operations to optimize the availability of called subsystems, which have just completed the data transfer sequence for a previous connection, for subsequent connect requests. In this manner, a switch minimizes the occurrences of a non-queued connect request being rejected by a called system when a calling subsystem, having completed its required data transfer and requested a disconnect, still has the disconnect pending due to switching delay inherent in the switching logic. Consequently, if disconnects are prioritized to thereby minimize non-queued connect request rejections, the calling subsystem responsible for the non-queued connect request will less frequently need to retry the connect request at a later time. Such retried connect requests add significant time to the connect request processing scheme, thereby reducing system performance.

Second, if a connect request is pending against a called subsystem that is known to be unconnected at the time of the request, this connection should be established ahead of connect requests pending against a called subsystem known to be currently connected. Third, because connection processing latency through a switch to switch interface at a cascade port is typically longer than that of connection processing at a subsystem attached I/O port, pending operations over the CP bus involving the cascade port should be given priority over similar operations which do not need to pass through the cascade port.

Applying the above three principles, a sequencing scheme may be developed for managing simultaneously pending requests to the CP bus 30 which optimizes control message throughput of the switch. Accordingly, the eight circuit switched CP bus operations described above should be prioritized and processed in the following order.

(i) a disconnect request by a calling subsystem to disconnect from a called subsystem which is connected to a cascaded switch and which is the destination of a pending queued connection request. This situation warrants highest priority because it is a disconnect operation involving the cascade port and because immediate switch utilization is guaranteed by immediately establishing the pending connect request after completing the disconnect operation.

(ii) a disconnect request by a calling subsystem to disconnect from a called subsystem which is connected to the same switch and which is the destination of a pending queued connection request. This situation is second highest priority because it is a disconnect request with a pending connect request to the same called subsystem. The switch immediately establishes the pending connect request after completing the disconnect operation.

(iii) a disconnect request by a calling subsystem to disconnect from a called subsystem which is connected to a cascaded switch and which is not the destination of any pending queued connection requests. This condition warrants third priority because, although no connect is pending for the cascaded called subsystem, it is nonetheless a disconnect operation.

(iv) a disconnect request by a calling subsystem to disconnect from a called subsystem which is connected to the same switch and which is not the destination of any pending queued connection requests. This is the lowest priority disconnect operation because no connect is pending for the called subsystem and it does not involve a cascade port.

(v) a connection request, which has not been queued, by a calling subsystem to a called subsystem connected to a cascaded switch. This situation is highest priority connect operation (fifth highest priority overall) because it is a non-queued connect request operation from a cascade port and therefore subject to a lengthy retry procedure if rejected. The switch response to this pending condition should be to perform the connection request from the calling subsystem to the called subsystem. If the called subsystem accepts the request, the switch should establish the connection, but if the called subsystem does not accept the request, the switch should reject it.

(vi) a connection request, which has been queued, by a calling subsystem to a called subsystem connected to a cascaded switch. This situation warrants sixth priority because it is a connect request operation from a cascade port which will be queued and therefore not subject to a lengthy retry procedure if rejected. The switch response to this pending condition should be to perform the connection request from the calling subsystem to the called subsystem. If the called subsystem accepts the request, the switch should establish the connection, but if the called subsystem does not accept the request, the switch should queue it.

(vii) a connection request, which has not been queued, by a calling subsystem to a called subsystem connected to the same switch. This condition warrants seventh priority because it is a non-queued connect request operation, not destined for the cascade port, and subject to a retry procedure if rejected, although not as lengthy a retry procedure as would be encountered if the non-queued connect request operation was destined for the cascade port. The switch response to this pending condition should be to perform the connection request from the calling subsystem to the called subsystem. If the called subsystem accepts the request, the switch should establish the connection, but if the called subsystem does not accept the request, the switch should reject it.

(viii) a connection request, which has been queued, by a calling subsystem to a called subsystem connected to the same switch. This condition warrants last priority because it is a connect request operation from a non-cascade port which will be queued and therefore not subject to a lengthy retry procedure if rejected. The switch response to this pending condition should be to perform the connection request from the calling subsystem to the called subsystem. If the called subsystem accepts the request, the switch should establish the connection, but if the called subsystem does not accept the request, the switch should queue it.

With respect to packet switched operations occurring over the OB bus 32, three different types of acknowledgment operations could simultaneously request processing over the OB bus. They are:

(i) data acknowledgment messages to and from subsystems attached to the same switch;

(i) data acknowledgment message to and from subsystems attached to a cascaded switch; and (iii) connect request acknowledgment messages from subsystems attached to a cascaded switch.

The determination of the sequence in which simultaneously pending acknowledgments to the OB bus are prioritized and subsequently processed is based on the following three principles. First, connect request acknowledgment messages, when routed to a calling subsystem, guarantee productive switch utilization since the calling subsystem immediately begins data transmission upon receipt of the acknowledgment message. Second, data acknowledgment messages, when routed to a calling subsystem, will only lead to improved switch utilization if the receipt of the acknowledgment message by the calling subsystem is in the critical path to continuing further data transfer operations. Third, as in the circuit switched analysis, operations involving the cascade port should be given higher priority.

Applying the above three principles, a sequencing scheme may be developed for managing simultaneously pending acknowledgments made to the OB bus 32 which optimizes control message throughput of the switch. Accordingly, the three types of packet switched OB bus operations described above should be prioritized and processed in the following order. The specific logic designs required to implement a bus arbitration mechanism for this processing scheme, as well as the processing scheme described above relating to operations on the CP bus, are apparent to those skilled in the art.

(i) connect request acknowledgment messages from subsystems attached to a cascaded switch. This is the highest priority condition because routing this message will result in immediate switch utilization.

(ii) data acknowledgment message to and from subsystems attached to a cascaded switch. This situation warrants second priority because, although routing this message may or may not lead to immediate switch utilization, it is routed through the constricted cascade port.

(iii) data acknowledgment messages to and from subsystems attached to the same switch. This is the lowest priority OB bus operation because it is not a connect request acknowledgment and it is not routed through the cascade port.

Because connect and disconnect operations over the CP bus 30 can proceed independently of acknowledgment operations over the OB bus 32, the sequencing procedures described above for managing simultaneously pending acknowledgments made to the OB bus 32 and simultaneously pending connect and disconnect requests to the CP bus 30 may be designed to operate concurrently.

Accordingly, the preferred embodiment of a method of sequencing bus operations in a simplex switch has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. A prioritization scheme for determining a predefined sequential order of processing each contending connection and disconnection request through a simplex switch which is initiated by interconnected subsystems in a data communications system, independent of the order in which said requests are initiated, said prioritization scheme comprising the steps of:
   (i) determining which of said contending requests are disconnect requests and processing all disconnect requests before processing any connect requests;
   (ii) for each contending group of disconnect requests, determining a first subset of disconnect requests which are destined for an interconnected subsystem which currently has pending against it a connection request and processing said first subset of requests before processing a second subset of disconnect requests which are destined for interconnected subsystems which currently have no connection requests pending against them; and then
   (iii) for each contending group of connect requests, processing non-queued requests before processing queued requests.

2. A prioritization scheme for determining the order of processing contending connection and disconnection requests through a simplex switch which are initiated by interconnected subsystems in a data communications system, said data communications system comprises of at least two cascaded simplex switches each having connected thereto at least one interconnected subsystem, said prioritization scheme comprising the steps of:
   (i) determining which of said contending requests are disconnect requests and processing all disconnect requests before processing any connect requests;
   (ii) for each contending group of disconnect and connect requests, determining a first subset of requests which are destined for an interconnected subsystem which currently has pending against it a connection request and processing said first subset of requests before processing a second subset of requests which are destined for interconnected subsystems which currently have no connection requests pending against them; and
   determining, for each of said first and second subsets of requests, cascaded requests which are requests destined for an interconnected subsystem that is not attached to the same simplex switch as the subsystem originating the request but is instead attached to a cascaded simplex switch, and processing said cascaded requests before processing non-cascaded requests which are requests destined for an interconnected subsystem that is attached to the same simplex switch as the subsystem originating the request.

3. The method of claim 2, wherein said connection and disconnection requests are passed through to said cascaded simplex switches via a plurality of I/O ports on each of said switches, each of said I/O ports being adapted to be connected to either an attached subsystem or an I/O port on another simplex switch.

4. The method of claim 3, wherein said connection and disconnection requests are passed through to said cascaded simplex switches via sixteen I/O ports on each of said switches, said sixteen I/O ports provided by eight port modules each having a pair of I/O ports.

5. The method of claim 3, further comprising the step of queuing requests in a buffer in each of said I/O ports on said simplex switches.

6. The method of claim 5, further comprising the step of passing incoming and outgoing data, respectively, over dedicated data input buses and dedicated data output buses which connect each of said I/O ports to an internal switching fabric.

7. The method of claim 2, wherein said connect and disconnect requests are managed by a circuit switching bus.

8. A prioritization scheme for determining the order of processing contending data acknowledgment and connect request acknowledgment messages through a simplex switch which are initiated by interconnected subsystems in a data communications system, said data communications system being comprised of at least two cascaded simplex switches each having connected thereto at least one interconnected subsystem, said prioritization scheme comprising the steps of:
   (i) determining which of said contending messages are connect request acknowledgement messages and processing all connect request acknowledgement messages before processing any data acknowledgment messages; and
   (ii) determining, for each contending group of connect request acknowledgement messages and data acknowledgment messages, cascaded messages which are messages destined for an interconnected subsystem that is not attached to the same simplex switch as the subsystem originating the message but is instead attached to a cascaded simplex switch, and processing said cascaded messages before processing non-cascaded messages which are messages destined for an interconnected subsystem that is attached to the same simplex switch as the subsystem originating the message.

9. The method of claim 8, wherein said connection and disconnection requests are passed through to said cascaded simplex switches via a plurality of I/O ports on each of said switches, each of said I/O ports being adapted to be connected to either an attached subsystem or an I/O port on another simplex switch.

10. The method of claim 9, wherein said connection and disconnection requests are passed through to said cascaded simplex switches via sixteen I/O ports on each of said switches, said sixteen I/O ports provided by eight port modules each having a pair of I/O ports.

11. The method of claim 9, further comprising the step of queuing requests in a buffer in each of said I/O ports on said simplex switches.

12. The method of claim 11, further comprising the step of passing incoming and outgoing data, respectively, over dedicated data input buses and dedicated data output buses which connect each of said I/O ports to an internal switching fabric.

13. The method of claim 8, wherein said data acknowledgment and connect request acknowledgment messages are managed by a packet switching bus.

* * * * *